United States Patent
Yeo et al.

(10) Patent No.: US 11,396,210 B2
(45) Date of Patent: *Jul. 26, 2022

(54) PNEUMATIC VEHICLE TIRES

(71) Applicant: Continental Reifen Deutschland GmbH, Hannover (DE)

(72) Inventors: Chun Yi Yeo, Hannover (DE); Andreas Haertwig, Hannover (DE); Florian Kristen, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 242 days.

This patent is subject to a terminal disclaimer.

(21) Appl. No.: 16/008,850

(22) Filed: Jun. 14, 2018

(65) Prior Publication Data

US 2018/0290500 A1  Oct. 11, 2018

Related U.S. Application Data

(63) Continuation of application No. PCT/EP2016/072398, filed on Sep. 21, 2016.

(30) Foreign Application Priority Data

Dec. 16, 2015 (DE) ...................... 10 2015 225 417.8

(51) Int. Cl.
*B60C 11/13* (2006.01)
*B60C 11/03* (2006.01)

(52) U.S. Cl.
CPC ...... *B60C 11/1369* (2013.01); *B60C 11/0316* (2013.01); *B60C 2011/0313* (2013.01);
(Continued)

(58) Field of Classification Search
CPC ............. B60C 11/0302; B60C 11/1369; B60C 11/0316
(Continued)

(56) References Cited

U.S. PATENT DOCUMENTS 4,913,208 A * 4/1990 Anderson ........... B60C 11/1369
152/209.18
5,975,172 A  11/1999 Nakatsuji
(Continued)

FOREIGN PATENT DOCUMENTS

CN 202826989 U * 3/2013
DE 102010060946 A1 * 6/2012 ......... B60C 11/0302
FR 3011512 A1 4/2015

OTHER PUBLICATIONS

International Search Report dated Dec. 6, 2016 of international application PCT/EP2016/072398 on which this application is based.
(Continued)

*Primary Examiner* — Timothy Kennedy
*Assistant Examiner* — Farah Taufiq
(74) *Attorney, Agent, or Firm* — Gregory Adams; David L. Cate

(57) ABSTRACT

The invention is directed to a pneumatic vehicle tire having a tread with profile positives which are separated from one another in a circumferential direction by transverse channels which extend continuously from the central region of the tread to the lateral tread edges and which are main channels of the tread and which, at least over the major part of the course thereof, have the maximum provided profile depth. The tread has, as profile positives, two rows of transverse ribs which are of encircling form in the circumferential direction and which are separated from one another by respective transverse channels. The tread is of directional configuration, wherein the transverse ribs of one row, and thus the transverse channels running between the transverse ribs, run, with respect to the axial direction, oppositely in relation to the transverse ribs and transverse channels of the other row.

10 Claims, 2 Drawing Sheets

(52) U.S. Cl.
CPC ... *B60C 2011/1361* (2013.01); *B60C 2200/06* (2013.01); *B60C 2200/065* (2013.01)

(58) Field of Classification Search
USPC .................................................. 152/209.22
See application file for complete search history.

(56) References Cited

U.S. PATENT DOCUMENTS

| | | | |
|---|---|---|---|
| 6,000,451 A | 12/1999 | Takada | |
| 2003/0094227 A1* | 5/2003 | Bettiol | B60C 11/042 |
| | | | 152/209.18 |
| 2008/0105347 A1* | 5/2008 | Matsunaga | B60C 11/0083 |
| | | | 152/209.14 |
| 2009/0199943 A1* | 8/2009 | Boiocchi | B60C 11/0316 |
| | | | 152/209.8 |
| 2013/0292019 A1* | 11/2013 | Vervaet | B60C 11/033 |
| | | | 152/209.18 |

OTHER PUBLICATIONS

Hamiza et al: "tractor-tire-tread", https://www.dreamstime.com/royalty-free-stock-photography-tractor-tire-tread-background-image28489567, Jan. 24, 2014, XP55321190, 3 pages.

* cited by examiner

Fig. 2 Section II - II

Fig. 3 Section III - III
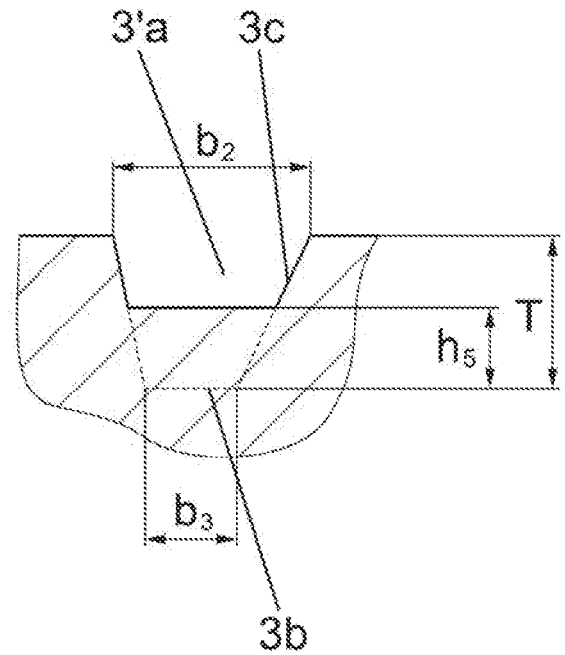
Fig. 4 Section IV - IV
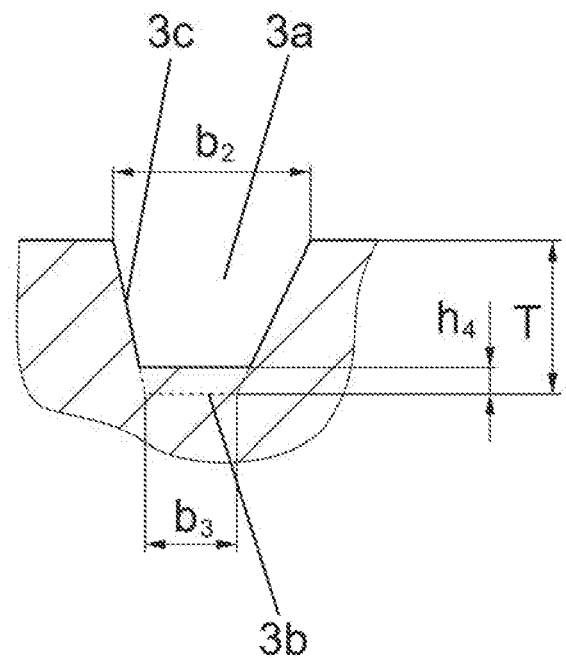

PNEUMATIC VEHICLE TIRES

CROSS REFERENCE TO RELATED APPLICATIONS

This application is a continuation application of international patent application PCT/EP2016/072398, filed Sep. 21, 2016, designating the United States and claiming priority from German application 10 2015 225 417.8, filed Dec. 16, 2015, and the entire content of both applications is incorporated herein by reference.

FIELD OF THE INVENTION

The invention relates to a pneumatic vehicle tire, in particular utility vehicle tire, having a tread with profile positives which are separated from one another in a circumferential direction by transverse channels which extend continuously from the central region of the tread in each case as far as the lateral tread edges and which are main channels of the tread and which, at least over the major part of the course thereof, have the maximum provided profile depth.

BACKGROUND OF THE INVENTION

Pneumatic vehicle tires having a tread in which transverse channels are the main channels are used in particular on utility vehicles which are driven on stony or gravelly underlying surfaces, for example on building sites. In the case of such treads, it is particularly important to ensure that stones do not become trapped in the main channels, because they can cause cut damage in the tread rubber, which can damage the tire as far as into the region of the belt and consequently render the tire unusable. It is therefore known for base elevations to be formed on the channel base of the main channels, which base elevations ensure an effective ejection of the stones and prevent stones from becoming trapped. The known base elevations on the channel base are of relatively small dimensions and formed in a closely spaced manner, such that a multiplicity of such elevations is provided in each transverse channel.

U.S. Pat. No. 5,975,172 A provides a pneumatic vehicle tire with two profile block rows running in encircling fashion in a circumferential direction in the middle region of the tread, which profile block rows are separated from one another by a circumferential channel. On the channel base of the circumferential channel, there is formed a multiplicity of projections which are lined up together in the circumferential direction and which are of rectangular cross section. The projections are intended to prevent stones from becoming trapped, and to promote the ejection of trapped stones. The projections on the channel base of the channels of the tread of a pneumatic vehicle tire known from U.S. Pat. No. 6,000,451 A are also intended to perform this function. The tread is divided into profile blocks, wherein, in the central region of the tread, there are arranged profile blocks which are encircled by channels, on the channel base of which there are formed differently dimensioned projections.

It is known that the middle region of the tread is particularly susceptible to trapping of stones and to the occurrence of the cut-and-chip effect—the formation of tears on the channel base and, as a consequence of the tears, a breakaway or flaking-off of rubber material. The hitherto known treads with base elevations on the channel base cannot offer an optimum solution in this regard.

SUMMARY OF THE INVENTION

It is an object of the invention to provide a pneumatic vehicle tire improved with respect of the foregoing.

The stated object is achieved according to the invention in that the tread has, as profile positives, two rows of transverse ribs which are of encircling form in the circumferential direction and which are separated from one another in each case by transverse channels, and the tread is of directional configuration, wherein the transverse ribs of one row, and thus the transverse channels running between the transverse ribs, run, with respect to the axial direction, oppositely in relation to the transverse ribs and transverse channels of the other row, wherein the transverse channels have end sections situated in a central region of the tread, wherein the end sections of the transverse channels and the transverse rib regions, situated in the central region, of one row overlap in the circumferential direction with the end sections of the transverse channels and the transverse rib regions, situated in the central region, of the other row, and wherein, in the end sections of the transverse channels, there is formed in each case one base elevation which is attached to the channel flanks of the end sections and which has a height of 40% to 60% of the channel depth at this location and, at its base, has an extent length of 30 mm to 50 mm.

By means of the concept on which the invention is based, of forming base elevations in the overlap regions of the transverse channels in the central region of the tread, which base elevations are of relatively large volume and have a large extent along the end sections of the transverse channels, it is firstly the case that the trapping of stones in the middle region of the tread is impeded, and it is secondly the case that the profile stiffness is increased somewhat in this region, whereby the occurrence of the cut-and-chip effect is substantially prevented. For an optimum course of the stiffness from the middle of the tread in the direction of shoulders, it is furthermore advantageous if the base elevations in the end section of the transverse channels are formed, at their end regions averted from the transverse channel ends, in each case as a ramp which slopes downward in the direction of the channel base of the transverse channel, wherein the ramp surface runs at an angle of 35° to 55° with respect to the channel base.

Furthermore, an embodiment of the invention is particularly advantageous in which the overlap width of the end sections of the transverse channels amounts to 15% to 30% of the ground contact patch width of the tread, such that the base elevations can be formed with a relatively large extent length in these overlap regions.

In a further embodiment of the invention, on the channel base of the transverse channels, a row of further base elevations is formed so as to extend over the entire course of the transverse channels, which further base elevations are attached to the channel flanks of the transverse channels and are configured such that their rubber volume becomes smaller the closer to the tread edge they are positioned. By means of this measure, any stones that ingress into the transverse channels are assisted in being "carried away" from the middle region of the tread to the side, to the tread edges.

An embodiment is particularly advantageous and preferred in which the rubber volume of the base elevations lined up together in one transverse channel becomes smaller in stepped fashion from base elevation to base elevation. In one possible configuration variant of the invention, the change in the rubber volumes can be associated with the fact that the extent lengths of the base elevations lined up together in one transverse channel becomes smaller the closer to the tread edge they are positioned, wherein preferably, the extent lengths become smaller in stepped fashion from base elevation to base elevation. It is alternatively or additionally also possible for the heights of the base elevations to be varied. In a preferred embodiment of the invention, in this regard, the height, determined from the level of the channel base, of at least one base elevation positioned in the middle region or in the central region of the tread is greater than the height of at least one base elevation positioned closer to or at the tread edge. The stiffness of the tread is thus greater in the middle region than in the lateral regions of the tread, wherein, owing to the decrease of the rubber volumes of the base elevations, a substantially uniform decrease in the stiffness from the middle in the direction of the shoulder regions is ensured. In this way, the trapping of stones in the sensitive middle region of the tread is impeded, the onward transport to the shoulders is assisted, and good traction is ensured.

It is preferable if at least those three base elevations which are lined up together in one transverse channel adjacent to the tread edge have a height of 5% to 20% of the channel depth at their respective position.

BRIEF DESCRIPTION OF THE DRAWINGS

The invention will now be described with reference to the drawings wherein:

FIG. 2 is a section view taken along the line II-II of FIG. 1; and,

FIGS. 3 and 4 show cross sections along the lines III-III and IV-IV, respectively, of FIG. 1.

DESCRIPTION OF THE PREFERRED EMBODIMENTS OF THE INVENTION

The invention is concerned with a particular configuration of a tread 1 of a pneumatic vehicle tire, especially of a utility vehicle tire or of a tire for light trucks, of radial type of construction. Pneumatic vehicle tires configured according to the invention are provided and suitable especially for use on gravelly or stony underlying surfaces, for example on building sites or off-road.

Figure 1:
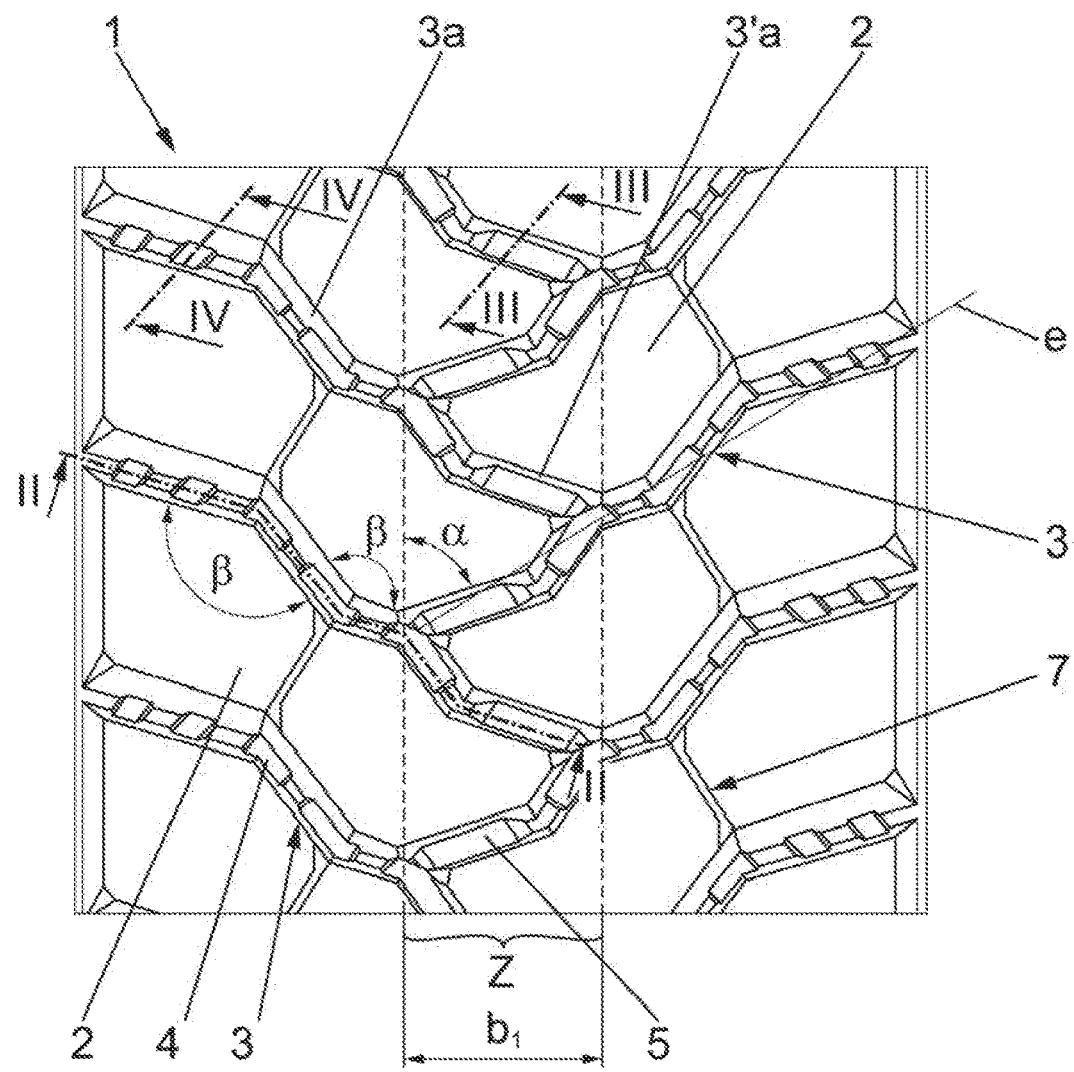
FIG. 1 shows a plan view of a circumferential section of a tread of a pneumatic vehicle tire according to the invention.
Figure 1:
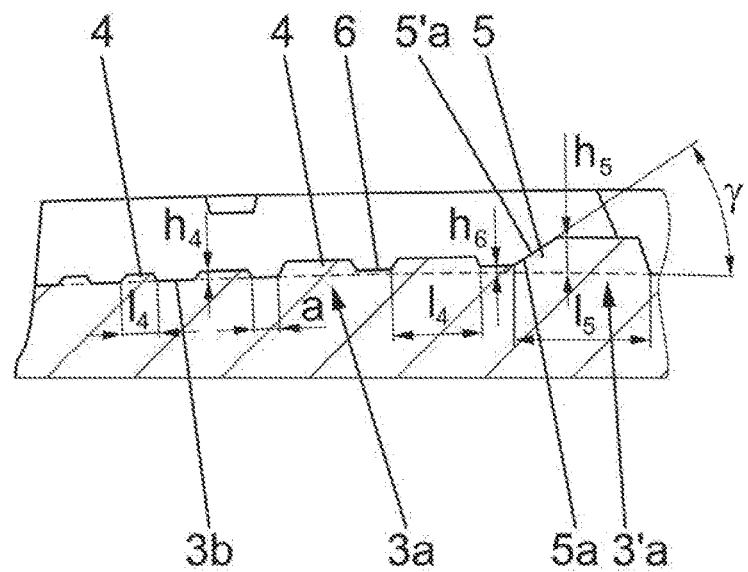

The tread 1 shown in FIG. 1 is dominated by two rows of transverse ribs 2 running in a circumferential direction, wherein, in each row, the transverse ribs 2 are separated from one another by transverse channels 3, which are the main channels of the tread 1 and which, at least over the major part of the course thereof, have the maximum profile depth provided for the corresponding tire, of for example 15 mm to 25 mm in the case of utility vehicle tires. In the context of the subject matter of the invention, transverse channels 3 are also to be understood to mean channels which extend at an angle of $\alpha \leq 45°$ with respect to the axial direction. The extent direction of one of these transverse channels 3 is shown in FIG. 1 by a straight line e. The embodiment shown in FIG. 1 furthermore involves a tread 1 of directional configuration, in the case of which the transverse ribs 2 of one row, and thus also the transverse channels 3 running between the transverse ribs, run, with respect to the axial direction, oppositely in relation to the transverse ribs 2 and transverse channels 3 of the other row. A pneumatic vehicle tire having a tread of this type is provided for being mounted on the vehicle such that, during forward travel, those ends of the transverse channels 3 which are situated at the inside of the tread enter the underlying surface first. Relatively narrow and shallow circumferential channels 7, which have especially a depth from 3 mm to 7 mm, have the effect that, in the case of a new tire, each transverse rib 2 is divided into two blocks.

In the central region Z of the tread, the transverse ribs 2 and the transverse channels 3 of one row overlap with transverse ribs 2 and the transverse channels 3 of the other row; the width of the region Z and thus the overlap width $b_1$ lie in the range from 15% to 30% of the ground contact area width of the tread 1. The transverse channels 3 and the transverse ribs 2 of one row are thus offset in the circumferential direction with respect to the transverse ribs 2 and the transverse channels 3 of the other row, wherein those end sections of the transverse channels 3 of one row which are situated at the inside of the tread open into those end sections of the transverse channels 3 of the other row which are situated at the inside of the tread.

Each transverse channels 3 is made up of multiple, in the embodiment shown five, channel sections $3a$, $3'a$ running in zigzag form relative to one another; a central channel section $3'a$ situated furthest toward the inside of the tread in the central region Z, and four further channel sections $3a$. The individual channel sections $3a$, $3'a$ enclose obtuse angles $\beta$, which amount to 115° to 155°, with one another. The number of channel sections $3a$, $3'a$ running in zigzag form, which preferably have different extent lengths, may amount to three to seven. It is basically also possible for the transverse channels 3 to extend in at least substantially rectilinear fashion. As can be seen from the section views in FIG. 3 and FIG. 4, the transverse channels 3 have one of the common channel cross sections with channel flanks $3c$ running in substantially V-shaped fashion, wherein the channel opening becomes wider toward the tread outer side. In the case of utility vehicle tires, the width $b_2$ of the transverse channels 3 at the tread outer surface amounts to 12 mm to 22 mm, wherein the width $b_2$ is at its smallest in the central region Z of the tread and becomes larger in the direction of the tread edge. The transverse channels 3 furthermore have, in the channel sections $3a$, $3'a$, a channel base $3b$ whose width $b_3$ is in particular constant and of equal size in all channel sections $3a$, $3'a$ and, in the case of utility vehicle tires, lies in the range from 3 mm to 5 mm, and is preferably 4 mm.

Along the channel base $3b$, there is formed a number of base elevations 4, 5 which are lined up together so as to be spaced apart from one another and which are of substantially trapezoidal form in the longitudinal section as shown in FIG. 2 and which are attached to the channel flanks $3c$ in the cross section as shown in FIG. 3 and FIG. 4. The base elevations 4 have, at their base, spacings a to one another of 8 mm to 13 mm, wherein the spacings a may be substantially equal or may vary. The base elevation 5, which has the greatest extent length $l_5$ and the greatest height $h_5$ of all base elevations, is situated in the central channel section $3'a$ situated furthest toward the inside of the tread. The base elevation 5 therefore also has the largest rubber volume. The rubber volume of the base elevations 4 formed along the channel base $3b$ in the direction of the tread edge decreases in stepped fashion from base elevation 4 to base elevation 4. Therefore, the base elevation 4 arranged directly at the tread edge on the channel base $3b$ has the smallest rubber volume.

The base elevations 4 have, at their base, different extent lengths $l_4$ which decrease with increasing distance from the central region Z, wherein each base elevation 4 is shorter by 10% to 30% than the base elevation 4 or 5 adjacent thereto and positioned further toward the inside of the tread. If a base elevation 4 runs across a bend point between successive channel sections $3a$, then the extent length of the base elevation is the sum of the lengths of the sections thereof.

In the embodiment shown, it is furthermore the case that the base elevation 5 positioned in the central region Z is connected to the base elevation 4 adjacent thereto, and is connected to the base elevation 4 adjacent thereto by means of web-like flat elevations 6 formed on the channel base 3b. The elevations 6 have, at their base on the channel base 3b, a height $h_6$ of 0.5 mm to 1.5 mm. It is possible for flat elevations 6, or no elevations whatsoever, to be provided between any base elevations.

The rubber volumes of the base elevations 4 that become smaller in the direction of the tread edge are preferably a result not only of the extent lengths $l_4$, $l_5$ of the base elevations 4, 5 that become smaller in stepped fashion but also of decreasing heights $h_4$, $h_5$ of the base elevations 4, 5. The height $h_5$ of the base elevation 5 formed furthest toward the inside of the tread amounts to 40% to 60% of the channel depth T. The heights $h_4$ of the base elevations 4 adjacent to the base elevation 5 amount to 5% to 20% of the channel depth T. In the embodiment shown, the two base elevations 4 that follow the base elevation 5 have equal heights $h_4$, as do the three base elevations 4 adjacent to these, wherein the heights $h_4$ thereof are smaller. In alternative embodiments, the base elevations 4 are either configured such that their heights become smaller in stepped fashion the closer to the tread edge they are positioned, or are configured such that they all have equal heights.

The base elevation 5 arranged in the central region Z of the tread 1 and in the channel section 3'a situated furthest toward the inside of the tread has, as mentioned, the largest rubber volumes of all of the base elevations; the rubber volume thereof amounts to at least five times the rubber volume of the base elevation 4 adjacent thereto. That end section of the base elevation 5 which faces toward the adjacent base elevation 4 is formed as a ramp 5a which slopes downward in the direction of the base elevation 4, wherein the ramp surface 5'a runs at an angle γ of 35° to 55° with respect to the plane of the channel base 3b.

The dimensioning of the base elevations 4, 5 is adapted in the respective tire sizes in a manner dependent on the profile depth, which for example in the case of utility vehicle tires amounts to 15 mm to 25 mm.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Tread
2 Transverse rib
3 Transverse channel
3a, 3'a Channel section
3b Channel base
3c Channel flank
4, 5 Base elevation
5a Ramp
5'a Ramp surface
6 Elevation
7 Circumferential channel
$b_1$, $b_2$, $b_3$ Width
e Line
$l_4$, $l_5$ Extent length
α, β, γ Angle
A Spacing
$h_4$, $h_5$, $h_6$ Height
Z Central region

What is claimed is:

1. A pneumatic vehicle tire for a vehicle including a utility vehicle tire, the pneumatic vehicle tire comprising:
    a tread having profile positives separated from one another in a circumferential direction by transverse channels which extend continuously from a central region (Z) of the tread to lateral tread edges and have the maximum provided profile depth;
    the tread having, as profile positives, rows of transverse ribs, the rows being of encircling form in the circumferential direction and which the rows are separated from one another by respective transverse channels;
    the transverse channels each having a plurality of base elevations;
    the tread being of directional configuration wherein the transverse ribs of one row are opposite with respect to axial direction to transverse ribs of an other row and overlap the other row;
    the transverse channels having respective end sections of the transverse channels situated in the central region (Z) of the tread;
    the end sections of the transverse channels and the transverse rib regions, situated in the central region, of one row overlapping in the circumferential direction with the end sections of the transverse channels and the transverse rib regions, situated in the central region, of the other row;
    in the end sections of the transverse channels, there being formed respective base elevations attached to the channel flanks of the end sections and which have a height (h5) of 40% to 60% of the channel depth (T) at this location and, at its base, have an extent length (l5) of 30 mm to 50 mm;
    wherein the transverse ribs each comprise adjacent blocks divided by a groove,
    the groove being relatively shallower and narrower than the transverse channel; and
    at least three base elevations of the plurality of base elevations for one of the transverse channels are lined up together adjacent to the tread edge have a height (h4) of 5% to 20% of the channel depth (T) at their respective position.

2. The pneumatic vehicle tire of claim 1, wherein the base elevations are formed, at their end regions averted from the transverse channel ends, as respective ramps which slope downward in the direction of the channel base of the transverse channel, wherein the ramp surface runs at an angle (Y) of 35° to 55° with respect to the channel base.

3. The pneumatic vehicle tire of claim 1, wherein the overlap width (b1) of the end sections of the transverse channels amounts to 15% to 30% of a ground contact patch width of the tread.

4. The pneumatic vehicle tire of claim 1, wherein, on the channel base of the transverse channels, a row of further base elevations is formed so as to extend over the entire course of the transverse channels, which further base elevations are attached to the channel flanks of the transverse channels and are configured such that their rubber volume becomes smaller the closer to the tread edge they are positioned.

5. The pneumatic vehicle tire of claim 1, wherein a rubber volume of the plurality of base elevations lined up together in one transverse channel becomes smaller in stepped fashion from base elevation to base elevation.

6. The pneumatic vehicle tire of claim 1, wherein the extent lengths (l4, l5) of all of the base elevations lined up together in one transverse channel becomes smaller the closer to the tread edge they are positioned.

7. The pneumatic vehicle tire of claim 1, wherein the extent lengths (l4, l5) of all of the base elevations lined up together in one transverse channel become smaller in stepped fashion from base elevation to base elevation in the direction of the tread edge.

8. The pneumatic vehicle tire of claim 1, wherein the height (h4, h5), determined from the level of the channel base of at least one base elevation positioned in the middle region or in the central region of the tread is greater than the height (h4) of at least one base elevation positioned closer to or at the tread edge.

9. The pneumatic vehicle tire of claim 1, wherein the transverse channels are main channels.

10. The pneumatic vehicle tire of claim 1, the groove having a depth of 3 mm to 7 mm and the transverse channel having a depth of 15 mm to 20 mm.

* * * * *